US012483549B2

(12) United States Patent
Bansal et al.

(10) Patent No.: US 12,483,549 B2
(45) Date of Patent: Nov. 25, 2025

(54) AUTHENTICATION DELEGATION TO SUPPORT INITIATION OF A SECURE USER WORKFLOW FROM AN UNSECURE DEVICE

(71) Applicant: Microsoft Technology Licensing, LLC, Redmond, WA (US)

(72) Inventors: Saurabh Bansal, Woodinville, WA (US); Kyle Marsh, Redmond, WA (US); Ibrahim Mohamed Esmat, Cedar Park, TX (US); Jimmy Yu Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 18/590,394

(22) Filed: Feb. 28, 2024

(65) Prior Publication Data

US 2025/0184322 A1 Jun. 5, 2025

Related U.S. Application Data

(60) Provisional application No. 63/604,951, filed on Dec. 1, 2023.

(51) Int. Cl.
*H04L 9/40* (2022.01)
(52) U.S. Cl.
CPC ............ *H04L 63/083* (2013.01); *H04L 63/10* (2013.01)
(58) Field of Classification Search
CPC ............................. H04L 63/083; H04L 63/10
See application file for complete search history.

(56) References Cited

U.S. PATENT DOCUMENTS

| | | | |
|---|---|---|---|
| 7,562,382 B2* | 7/2009 | Hinton | H04L 67/30 713/168 |
| 8,176,533 B1 | 5/2012 | Violleau | |
| 8,554,930 B2* | 10/2013 | Blakley, III | H04L 63/083 713/182 |
| 9,172,694 B2* | 10/2015 | Canning | G06F 21/335 |
| 9,323,916 B1 | 4/2016 | Wu | |
| 10,944,743 B2 | 3/2021 | Doshi | |
| 11,032,270 B1* | 6/2021 | Tsarfati | H04L 63/0281 |
| 11,153,303 B2 | 10/2021 | Scruby | |
| 11,755,712 B2 | 9/2023 | Cotterill | |
| 2011/0213956 A1 | 9/2011 | Mukkara | |

(Continued)

*Primary Examiner* — Chau Le
(74) *Attorney, Agent, or Firm* — Holzer Patel Drennan

(57) ABSTRACT

A disclosed method allows an unsecure device to initiate a user workflow contingent upon access to a permission-controlled resource. The method includes receiving, from the unsecure device, a delegation instruction including: a first token associated with a first entity registered with a cloud service platform; a request to execute an operation on a permission-controlled resource associated with a second entity registered with the cloud service platform; and a user identifier for the second entity. The method includes transmitting a notification to a storage location identified based on the user identifier, the notification includes an instruction that a user can follow to provide an access credential associated with the permission-controlled resource. The method further provides for executing the operation on the permission-controlled resource in response to receiving a second token generated in response to verification of the access credential.

20 Claims, 6 Drawing Sheets

(56) References Cited

U.S. PATENT DOCUMENTS

| | | | | |
|---|---|---|---|---|
| 2015/0150106 A1* | 5/2015 | Lund | .................... | H04L 63/083 |
| | | | | 726/7 |
| 2015/0222615 A1 | 8/2015 | Allain | | |
| 2015/0278500 A1* | 10/2015 | Burch | .................... | H04L 63/10 |
| | | | | 726/6 |
| 2017/0244695 A1* | 8/2017 | Lund | .................... | H04L 63/083 |
| 2018/0302391 A1* | 10/2018 | Jones | .................... | G06F 16/284 |
| 2019/0164165 A1* | 5/2019 | Ithabathula | ............ | G06F 21/34 |
| 2021/0250361 A1* | 8/2021 | Leibmann | ............ | H04L 63/105 |
| 2021/0314339 A1* | 10/2021 | Tsarfati | ................. | G06F 21/57 |
| 2022/0038448 A1 | 2/2022 | Defilippo | | |

\* cited by examiner

AUTHENTICATION DELEGATION TO SUPPORT INITIATION OF A SECURE USER WORKFLOW FROM AN UNSECURE DEVICE

CROSS-REFERENCE TO RELATED APPLICATIONS

The present application claims priority benefit to U.S. Provisional Patent Application with Ser. No. 63/604,951, entitled "Authentication Delegation to Support Initiation of a Secure User Workflow from an Unsecure User device" and filed on Dec. 1, 2023, which is hereby incorporated by reference for all that it discloses or teaches.

BACKGROUND

The proliferation of cloud-based service offerings has created a global account-based infrastructure in which user credentials are required to access a myriad of cloud-based resources. In various scenarios, a user may wish to initiate a workflow that requires access to a cloud-based permission-controlled resource from multiple different electronic devices. For example, a user may want to use any of a mobile phone, laptop, printer, or scanner to initiate a transfer of user data to a permission-controlled cloud storage location.

When initiating a user workflow that requires access to a permission-controlled cloud resource, a user traditionally provides account credentials directly to the device initiating the user workflow. The device, in turn, uses those account credentials to acquire access to the permission-controlled cloud resource. However, not all devices have equal security protections in place. As a result, some devices are more vulnerable than other devices to nefarious attacks and/or unauthorized accesses. For example, devices such as scanners and printers are often equipped with their own (uncommon) operating systems that are incompatible with security applications that are widely used within enterprises. For example, these security applications may support authentication practices that require users to provide their credentials directly to a secure identity provider rather than to the applications that condition access upon receipt of those credentials. The above-mentioned incompatibility issues may preclude certain devices, such as printers and scanners, from implementing these modern authentication practices.

Providing user account credentials directly to user devices, particularly more vulnerable devices, presents a security risk. If, for example, a user provides a scanner with user credentials for accessing a cloud storage account and the scanner is accessed by a nefarious actor, the nefarious actor can, as a result, gain access to the user credentials and all data protected by the user credentials.

SUMMARY

According to one implementation, a method provides a secure workflow that allows an unsecure device to initialize a user workflow that requires access to a permission-controlled resource. The method includes receiving, from an unsecure device, a delegation instruction that includes: a first token associated with a first entity registered with a cloud service platform; a request to execute an operation on a permission-controlled resource associated with a second entity registered with the cloud service platform; and a user identifier for the second entity. The method further includes identifying, in response to receipt of the delegation instruction, a user account associated with the user identifier, and transmitting a notification to a storage location associated with the user account. The notification includes an instruction that a user can follow to provide an access credential associated with the permission-controlled resource. The method further includes executing the operation on the permission-controlled resource in response to receiving a second token generated in response to verification of the access credential and without providing the unsecure device with access to the permission-controlled resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
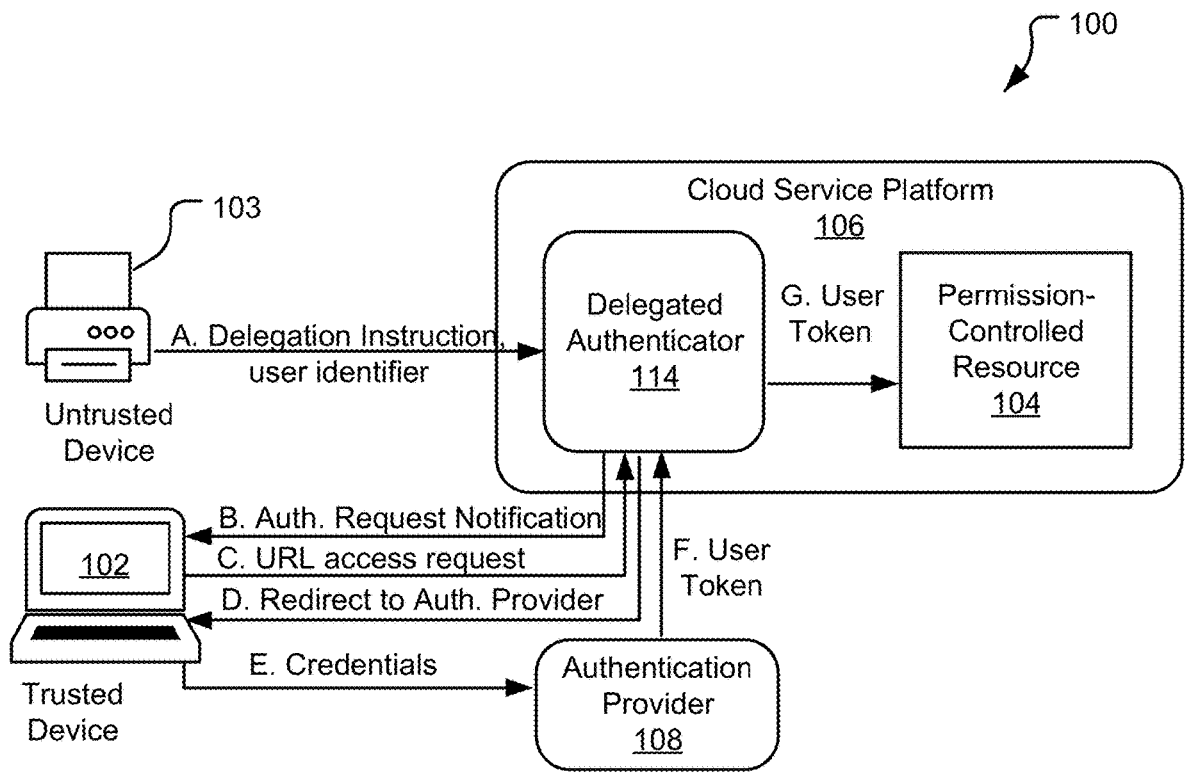
FIG. 1 illustrates an example system that facilitates initiation of a secure workflow from an unsecure device.

It is common for business enterprises to enforce security policies that require on-premise devices to comply with security requirements that entail, for example, local execution of one or more security-enhancing applications on each compliant device. Due to operating system incompatibility with these applications and other factors, it may not be possible for a given device to comply with all security requirements of a given enterprise. Currently, it is common practice for enterprises to relax security requirements for these incompatible devices because it is desirable and, in some cases, necessary to use these devices in the workplace and to provide these devices with access to certain permission-protected resources that reside in cloud storage. For example, an organization may want to have printers and/or scanners that can be used to transmit data to cloud storage locations or that can initiate other user workflows that depend upon access to cloud-based permission-controlled resources. This presents a heightened security risk for the enterprise.

The herein disclosed technology is a cloud-based service, referred to herein as a "delegated authenticator" that initiates an authentication sequence on behalf of an unsecure device such that the unsecure device is never presented with a set of user credentials that are verified during the authentication sequence. As used herein, the term "unsecure device" refers to a device that, for any reason, presents a security vulnerability for a user or enterprise and that is therefore not trusted to receive a set of user credentials. Notably, the term unsecure device does not necessarily refer to a device that is unverifiable. In some implementations, an unsecure device is capable of presenting credentials usable to verify its identity. For example, an unsecure device can still have a device access token to a cloud service (meaning it is verifiable and therefore, partially trustable). In one implementation, the delegated authenticator is a cloud-based service executed by one or more servers compliant with a stringent set of security requirements and is, consequently, less vulnerable to nefarious attack than the unsecure device. In contrast with the above, a secure device is a device that is both trusted and secure, such as due to compliance with stringent (predefined) security protocols.

In one implementation, a user interacts with the unsecure device to initiate a user workflow that includes at least one access operation on a permission-controlled resource. The unsecure device is equipped with a local agent that delegates the resource access operation(s) to the delegated authenticator. The delegated authenticator, in turn, communicates with an authentication provider to initiate an authentication sequence that prompts the user to provide access credentials from a secure device. Upon verifying the user credentials provided from the secure device, the authentication provider grants the delegated authenticator access to the permission-controlled resource, and the delegated authenticator executes the access operation(s) on the permission-controlled resource.

In one implementation, the delegated authenticator facilitates secure end-to-end execution of a user workload that entails a transfer of a user payload (e.g., user data, such as a scanned document) to a permission-controlled storage location associated with an account of the user. The unsecure device uses a stored credential to obtain a first token (e.g., a device token) from an authentication provider, and this first token is presented to the authentication delegator as proof that the user payload is coming from a known, verifiable source. Upon receipt of validation of the first token, the delegated authenticator copies the user payload into a secure temporary storage location provisioned for the device that is sending the user payload. The delegated authenticator then initiates the above-mentioned authentication sequence that depends upon receipt of user credentials from a secure device. Once the user credentials are verified by the authentication provider, the delegated authenticator is granted access to the permission-controlled resource and the delegated authenticator transfers the user payload from the temporary secure storage region to the requested permission-controlled storage location.

FIG. 1 illustrates an example system 100 that facilitates initiation of a secure workflow from an unsecure device 103. In the illustrated example, a user utilizes the unsecure device 103 to initiate a workload that includes one or more operations that depend upon access to a permission-controlled resource 104. For example, the workload is a scan-to-storage operation that entails transferring a file stored locally on the unsecure device 103 (e.g., a scanner) to a cloud storage account of the user (e.g., the permission-controlled resource 104).

In the various implementations disclosed herein, the term "permission-controlled resource" is intended to refer to a storage, data, or processing resource that is access-restricted to those that can provide a valid credential or set of credentials. In some scenarios, the permission-controlled resource 104 is a resource that the user seeks to read, modify, or write to during a requested user workflow. In other scenarios, the permission-controlled resource 104 is a storage resource (e.g., a cloud-based user storage account or one of more files residing in a storage account) or a cloud-based processing resource that the user is accessing (e.g., leasing) in association with a cloud-based user account.

In various implementations, the user may perform different types of input to the unsecure device 103 to trigger initiation of the workload. In some implementations, the user provides physical inputs to the unsecure device 103 or an accessory device. For example, the unsecure device is a scanner and the user interacts with a menu of the scanner to select a "scan-to-cloud storage" option. Alternatively, the user may initiate the workload on a personal device and transmit the workload to the unsecure device for execution.

In response to user inputs initiating the workload, unsecure device 103 locally executes an agent (not shown) that delegates execution of some or all aspects of the user workflow to a delegated authenticator 114, which can be understood as a software entity that is managed by the cloud service platform 106 and that controls access to the permission-controlled resource 104.

The unsecure device 103 delegates, to the delegated authenticator 114, a delegation instruction (e.g., at arrow A) that instructs the delegated authenticator 114 to carry out a subset of operations of the initiated workload that require user authentication and access to the permission-controlled resource 104. The term "delegation instruction" is used because the transmission of this instruction serves to delegate the access operation on the permission-controlled resource 104 from the unsecure device 103 to the delegated authenticator 114. The delegation instruction (at arrow A) specifies a delegated portion of the initiated workload (e.g., commands to be executed, data to be operated on) along with a user identifier for the requesting user, such as a user principal name (UPN). Upon receipt of the delegation instruction, the delegated authenticator 114 utilizes the user identifier (e.g., UPN) and/or other information included in the delegation instruction to (1) identify the permission-controlled resource 104 as a target of the access request and (2) to identify a communication account of the user associated with the user identifier (e.g., an email account, internet-based messaging account, or short messaging service (SMS) account).

In response to this request, the delegated authenticator 114 transmits an authentication request notification to that communication account (at arrow "B"). This authentication request notification includes an instruction that the user can take to authorize the delegated authenticator 114 to access the permission-controlled resource 104.

In one implementation, the authentication request notification transmitted at arrow "B" is a text message that includes a URL and an instruction asking the user to click the URL from a secure device (e.g., a secure device 102). When the user accesses the authentication request notification and clicks the URL from the secure device 102, the user is initially directed to a permission-controlled webpage of the delegated authenticator 114 (as shown by arrow C). This attempt to access the permission-controlled webpage triggers a redirect of the user's web browser to a webpage of the authentication provider 108 (with the redirect being shown by arrow D).

The webpage of the authentication provider 108 (e.g., reached by the re-direct shown at arrow D) requests access credentials for a user account with the cloud service platform 106 (e.g., the same storage account that stores the permission-controlled resource 104) The user provides their credentials to authentication provider 108 (at arrow E). In response to validating the user's credentials, the authentication provider 108 generates a user token and delivers this token to the delegated authenticator 114 (at arrow F) which, in turn, uses the user token to acquire access to the permission-controlled resource 104 (as shown by arrow G). The delegated authenticator 114 then proceeds to execute any remaining actions of the client workload that it has been entrusted to perform by way of the delegation instruction.

Notably, not all implementations provide for sending the notification (e.g., at arrow B) to a user communication account to solicit the user authentication. In some implementations, the notification is sent to and presented by a web-based application server that, in turn, presents the notification within a user interface generated by the web-based application server during a user session associated with the user identifier included in the delegation instruction. For example, the notification is sent to a cloud storage service provider hosted by the cloud service platform 106, and the cloud storage service provider presents the notification on a user interface that a user interacts with to view account information for an account registered in association with the user identifier. The notification includes the URL link as described above or other instruction for navigating to a webpage of the delegated authenticator 114 to supply the access credential, as described above.

In yet still another implementation, delegated authenticator 114 does not send the notification and the user instead self-navigates to a webpage of the delegated authenticator 114 on the secure device 102 and interacts with a menu option to initiate the redirect shown by arrow D, at which point the user can supply the access credentials as described above.

Per the above-described operations, the permission-controlled resource 104 is accessed as prescribed by the workload and the unsecure device 103 is not given to the authentication credentials associated with the permission-controlled resource 104 or to the permission-controlled resource 104 itself. The delegated authenticator 114 orchestrates delivery of account credentials to the secure device 102 to the authentication provider 108 and performs the delegated actions on the permission-controlled resource Once the account credentials are verified.

Figure 2:
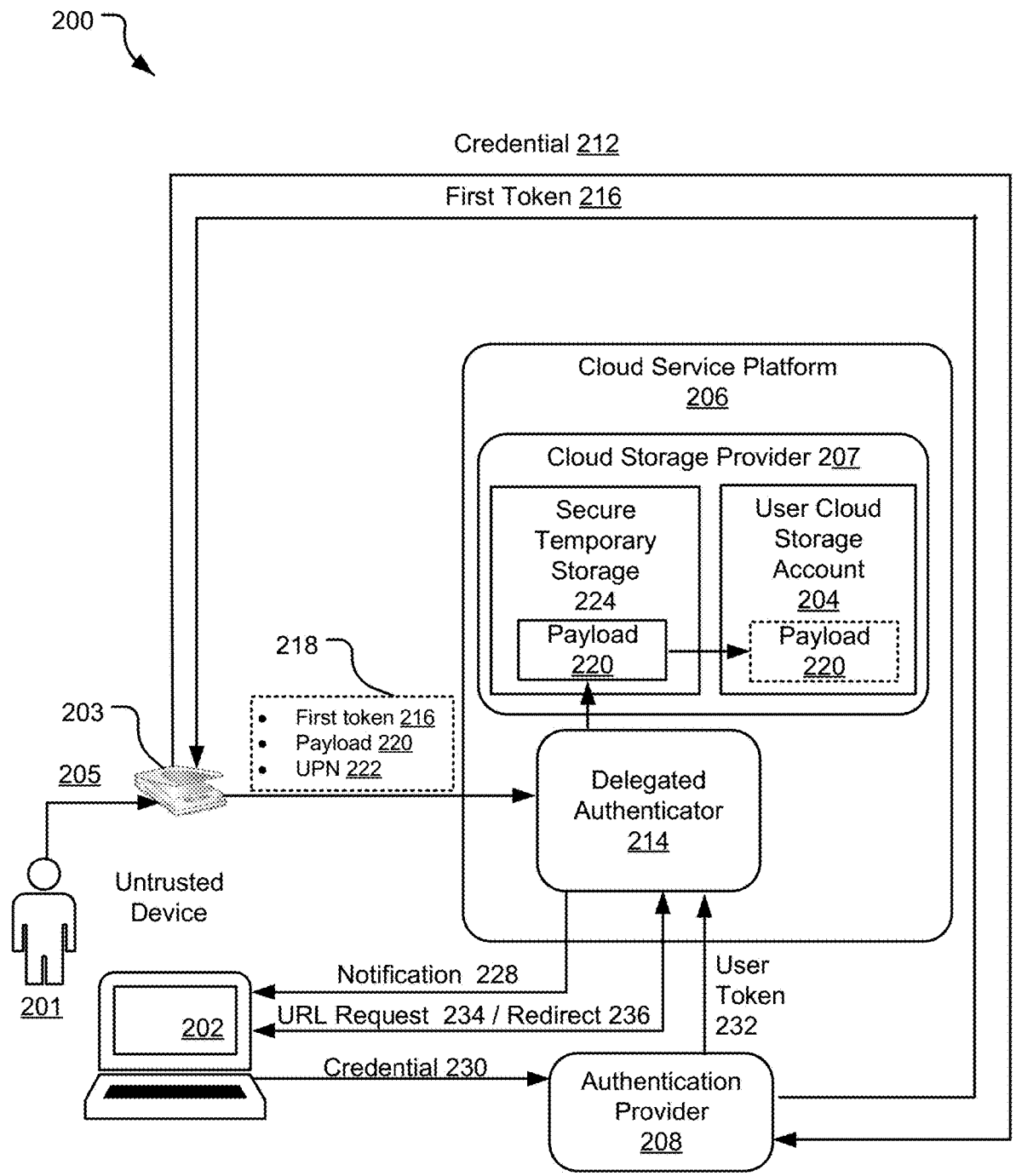
FIG. 2 illustrates another example system that facilitates initiation of secure workflows from an unsecure device.

FIG. 2 illustrates another example of a secure authentication flow 200 initiated from an unsecure device 203. In the secure authentication flow 200, a user 201 interacts with the unsecure device 203 to initiate a workload that requires access to a user cloud storage account 204 (e.g., an example permission-controlled resource), which is managed by a cloud storage provider 207. In this example, the workload requests a transfer of user data, referred to herein as a "payload 220", to the user cloud storage account 204. In the following description, certain operations of the workload are delegated a delegated authenticator 214, which can be understood as comprising web-based software hosted within a same cloud service platform 206 as the cloud storage provider 207. In one implementation, the various services hosted within the cloud service platform 206 utilize a same application programming interface (API) to facilitate communications between various web-based applications of the cloud service platform 206 and applications on client devices. Within the cloud service platform 206, web-based access tokens (e.g., user tokens and device tokens) are used to secure access to various resources. These web-based access tokens are API-specific. Therefore, in the secure authentication flow 200 of FIG. 2, a user or device token generated for the API of the cloud service platform 206 is a valid form of user authentication with respect to many different hosted services of the cloud service platform 206 including the delegated authenticator 214 and the cloud storage provider 207.

Web-based access tokens are, in the illustrated system, generated by an authentication provider 208 that acts as a centralized authentication entity for the cloud service platform 206, and in some implementations, a variety of other cloud service providers as well.

In one implementation, the unsecure device 203 is a smart scanner programmed with the capability of transmitting scanned data to designated web-based storage locations, and the user initiates the scan-and-save workflow by interacting with a touch screen of the smart scanner to provide user inputs 205 which, for example, include a user identifier and/or a designated storage destination for a scanned document. In some implementations, the scanner associates each user identifier with a cloud storage location that is used as a default storage location for scan jobs initiated in association with the user identifier. In these implementations, the user inputs include the user identifier and do not include a designated storage destination.

In response to receiving the user inputs 205 initiating the scan-and-save workflow, the unsecure device 203 transmits a credential 212 to an authentication provider 208 in exchange for a first token 216 (e.g., a JSON web token (JWT)) usable to verify its identity to the cloud service platform 206. In the illustrated example, it is assumed that the unsecure device 203 has previously registered itself with the authentication provider 208 and that the authentication provider 208 stores an entity associated with the unsecure device 203 that is registered for access to the cloud service platform 206. For example, the unsecure device 203 has a first account registered with the authentication provider 208 that is different from a second account (e.g., the user cloud storage account 204) that the user workflow requires access to. In one implementation, the first account is a "device only" account with limited scope (e.g., functionality and resource access) while the second account is a "user account" that has broader scope than the device only account (e.g., the user account greater functionality and/or resource access, such as by providing the user with remote document storage support and/or access to web-based applications).

In one implementation, initial registration of the unsecure device 203 with the authentication provider 208 is facilitated by an agent executed on the unsecure device 203 that is, for example, installed by a device administrator during a device initialization and configuration process. During the process, the agent generates a public/private key pair for the unsecure device 203 and stores the private key in a secure location on the unsecure device 203. The unsecure device 203 then sends the public key along with a Certificate Signing Request (CSR) to the authentication provider 208. In response, the authentication provider 208 returns a signed certificate that contains the public key. This signed certificate and the stored private key can now be used by the unsecure device 203 as the credential 212, which is transmitted to the authentication provider 208 in exchange for the first token 216. In one implementation, the first token 216 is device token usable by the unsecure device 203 to verify its identity with various hosted services utilizing the common API of the cloud service platform 206.

In response to receiving the first token 216, the unsecure device 203 transmits a delegation instruction 218 to the delegated authenticator 214. The delegation instruction 218 functions to delegate certain authentication and resource access operations(s) of the scan-and-save workflow to the delegated authenticator 214. In the illustrated example, the delegation instruction 218 can be understood as including (1) a first instruction to transfer the payload 220 to a location in secure temporary storage 224 and (2) a second instruction to transfer the payload 220 from the secure temporary storage 224 to the user cloud storage account 204 (e.g., the destination originally-requested by the user 201) after access to this account is authenticated. Additionally, the delegation instruction 218 includes the first token 216, a payload 220 (e.g., the scanned user data), and a user identifier 222 (e.g., a UPN) of the user.

In one implementation, access to the secure temporary storage 224 is conditioned upon receipt and verification of a web-based token that verifies identity of an entity corresponding to the unsecure device 203 that has previously created and stored by the authentication provider 208. The delegated authenticator 214 is, in this case, able to use the first token 216 (e.g., a device token for the unsecure device 203) to acquire access to the secure temporary storage 224.

In response to receipt of the delegation instruction 218, the delegated authenticator 214 (1) uses the first token 216 to temporarily store the payload 220 in the secure temporary storage 224 and then (2) proceeds to execute additional operations that orchestrate a transfer of the payload 220 to the user cloud storage account 204. To perform the first of these tasks, the delegated authenticator 214 reads and verifies the first token 216. In one implementation, the delegated authenticator 214 verifies the token by validating that the signature of the token was signed by the authentication provider 208 using published public signing keys of the authentication provider 208. In response to and contingent upon this verification, the delegated authenticator 214 transfers the payload 220 to a location within the secure temporary storage 224.

At this point in time, the first token 216 has been presented, verified, and used to gain access to the secure temporary storage 224. However, the payload 220 still has not been transferred to the user cloud storage account 204 (e.g., the final target destination for this data). In the secure authentication flow 200, the transfer of the payload 220 from the secure temporary storage 224 to the to the user cloud storage account 204 is contingent upon receipt and verification of access credentials of the user cloud storage account 204. At this point in time, the delegated authenticator 214 takes action to solicit the access credential for the user cloud storage account 204 from a secure device 292.

In the illustrated implementation, the delegated authenticator 214 automatically executes the actions that initiate and effect secure transport of the payload 220 from the secure temporary storage 224 to the user cloud storage account 204. Namely, the delegated authenticator 214 identifies a communication account (e.g., an email account or messaging account) associated with the user identifier 222 included in the delegation instruction 218 and transmits an authentication request notification (shown as "notification 228") to this communication account.

The notification 228 includes an instruction that the user can follow to grant the delegated authenticator 214 access to the user cloud storage account 204. In one implementation, the notification 228 includes a URL that the user 201 can click from the secure device 202. By clicking the URL from the secure device 202, the user 201 places a request 234 to access a webpage of the delegated authenticator 214 that requires user authentication. The user's web browser is redirected (e.g., by redirect 236) to a webpage of the authentication provider 208, which in turn prompts the user 201 for an access credential of the user cloud storage account 204. The user 201 provides the requested access credential (shown as credential 230). For example, the credential 230 is a password or a username/password pair for the user cloud storage account 204.

In some implementations, the notification 228 is not sent to a user communication account (e.g., email or messaging) but is instead displayed in a user interface (UI) that the user interacts with when the user is logged into the user cloud storage account 204. For example, the delegated authenticator 214 pushes the notification 228 to the cloud storage provider 207, and the cloud storage provider 207 presents the notification in a UI associated with the user cloud storage account 204. Here, the notification 228 may include a link or an instruction to the user to navigate to a webpage with a domain of the delegated authenticator 214 that redirects the user to the webpage of authentication provider 208, which in turn prompts the user 201 for an access credential associated with the user cloud storage account 204 (e.g., to grant the delegated authenticator 214 access to the user cloud storage account 204).

In response to receiving the credential 230, the authentication provider 208 verifies the credential, generates a user token 232, and delivers the token to the delegated authenticator 214. Upon receipt of the user token 232, the delegated authenticator 214 completes the second instruction included in the delegation instruction 218 by transmitting the user token 232 to the cloud storage provider 207 along with a request to transfer the payload 220 to the user cloud storage account 204.

In one implementation different from that shown in FIG. 2, the delegated authenticator 214 changes an access permission to grant the user 201 access to the payload 220 in the secure temporary storage 224 to allow access contingent by the user 201 upon receipt of access credentials associated with the user cloud storage account 204. In this implementation, the user 201 can then access the secure temporary storage 224 through a web-based interface and provide web interface inputs that initiate transfer the payload 220 to the user cloud storage account.

Figure 3A:
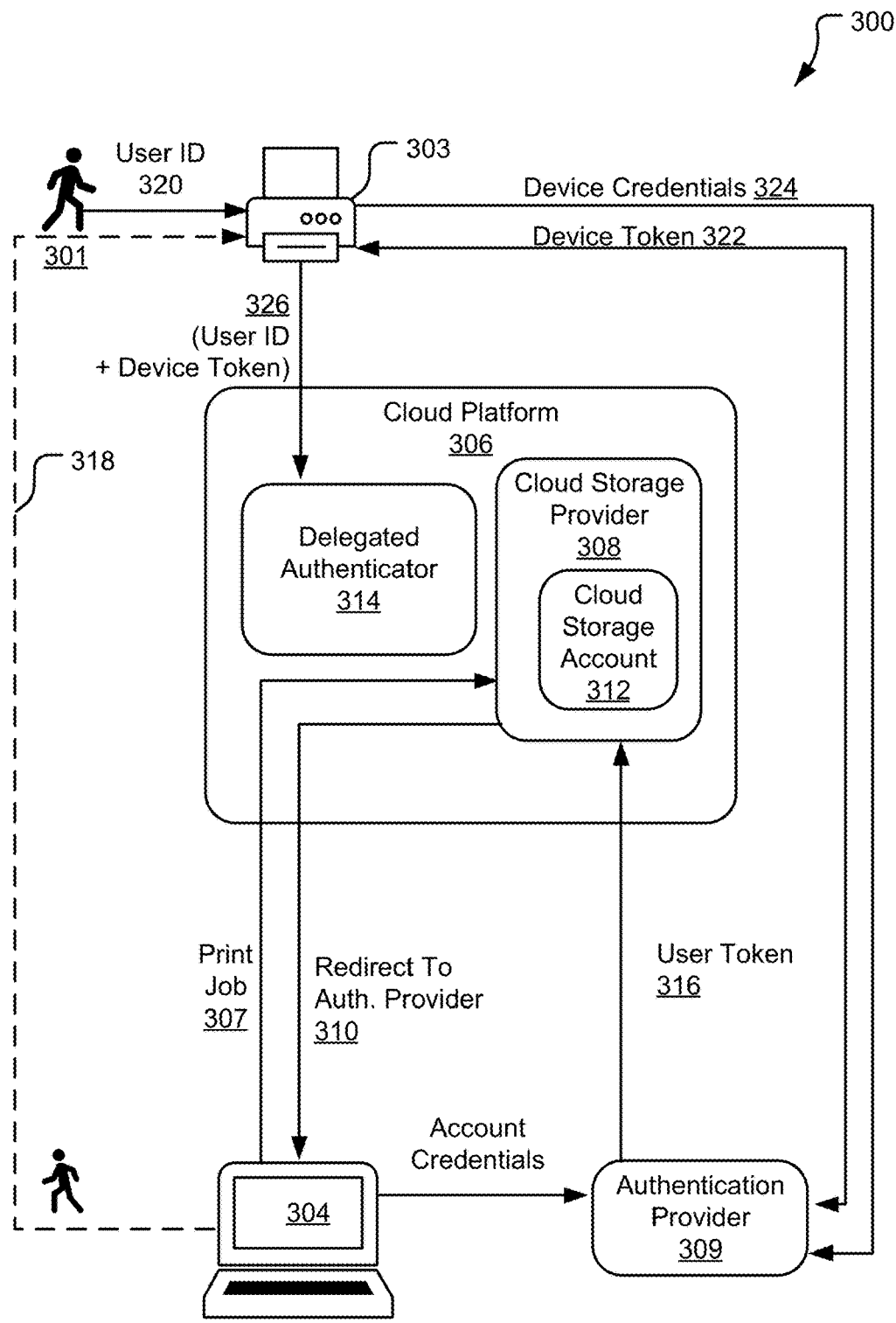
FIG. 3A illustrates aspects of another example system that securely utilizes an unsecure printer to initiate release and print of a document stored in a secure storage location.
Figure 3B:
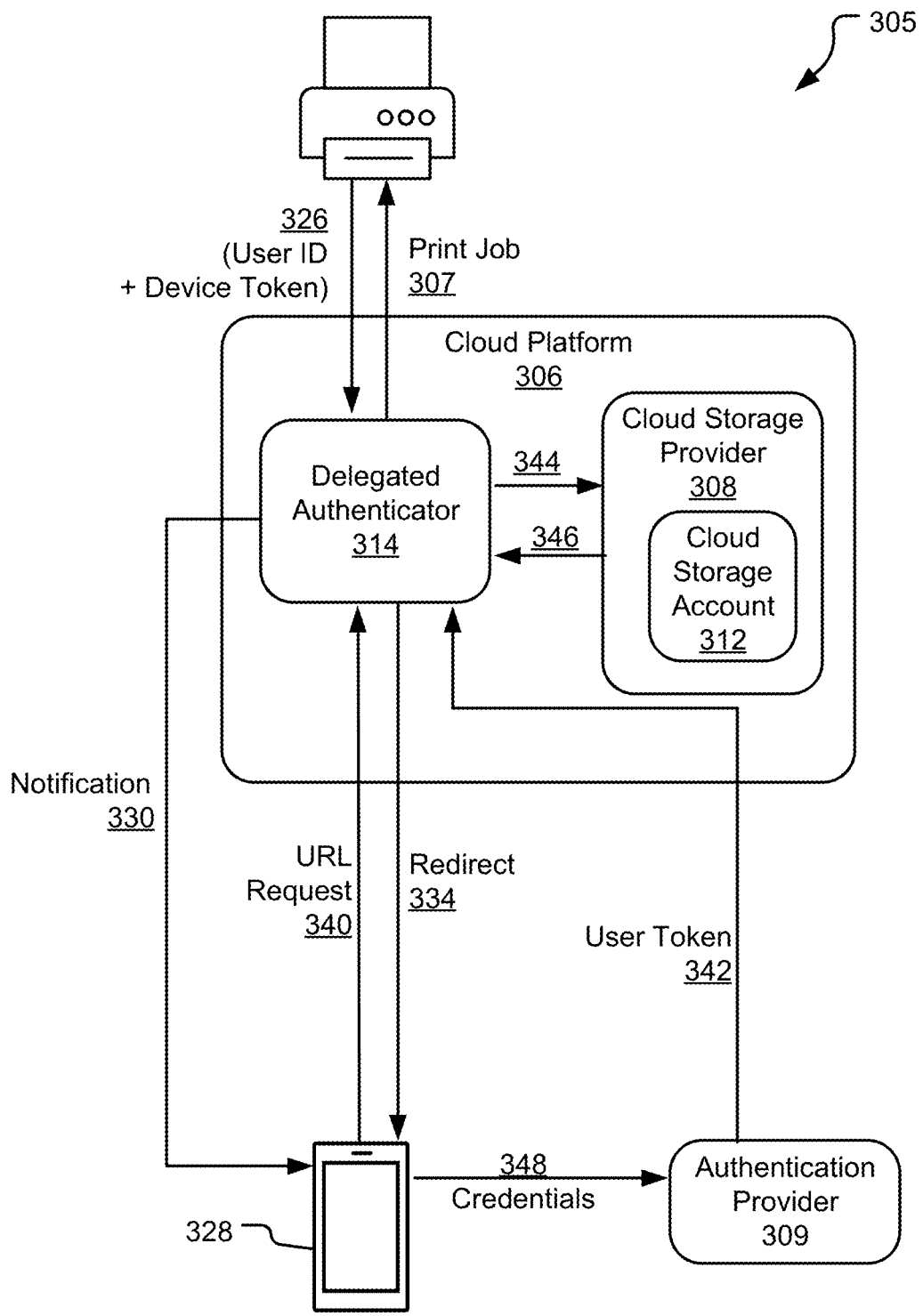
FIG. 3B illustrates further example operations of the secure authentication flow described with respect to FIG. 3A.

FIGS. 3A and 3B illustrate another secure authentication flow that utilizes an authentication delegator 314 to perform various operations of a user workload on behalf of an unsecure device. In the authentication flow of FIG. 3A-3B, the unsecure device is a printer 303 and the delegated authenticator 314 is tasked with authenticating the user as a condition of releasing a print job, initiated by the user 301, to the printer 303. For example, an enterprise may implement a security measure that requires a printer to authenticate a user before printing a document, such as to ensure that the user is physically present at the printer to securely collect pages of the print job.

FIG. 3A illustrates operations 300 for initializing a print job that is contingent upon a subsequently-performed user authentication that occurs when the user is physically present at the printer 303. The operations 300 begin with the user 301 interacting with a secure device 304 (e.g., a personal computer) to request a print job 307. For example, the example selects a "print" menu option from within an application window. The print job 307 is submitted, via the user's web browser, to a cloud storage provider 308. The cloud storage provider 308 provides cloud-based storage services and is part of a cloud service platform 306 that further includes an authentication delegator 314.

In one implementation, the print job 307 includes a print command designating the printer 303 as the target print device, a payload (e.g., a user document), and a user identifier that is associated with a cloud storage account 312 of the cloud storage provider 308.

Upon receipt of the print job 307, the cloud storage provider 308 responds with a redirect 310 that redirects the user's browser to a webpage of an authentication provider 309, which provides authentication services for services hosted by the cloud service platform 306. At the webpage of the authentication provider 309, the user 301 provides access credentials associated with the cloud storage account 312. The authentication provider 309, in turn, validates the user's credentials and, in response, generates a user token 316 for the user 301 that is returned to the cloud storage provider 308. The cloud service provider 308 uses the user token 316 to access the cloud storage account 312 and copies the payload for the print job 307 (e.g., the document being printed) to the user cloud storage account 312 for temporary storage. In one implementation, the payload is saved in a particular region of the cloud storage account 312 that is designated for pending print jobs. In another implementation, the payload is saved in association with an identifier (e.g., filename or other attribute) that is usable to subsequently identify the payload as a pending print job.

In the authentication flow of FIG. 3A, the printing of the user document(s) is contingent upon receipt and authentication of credentials associated with the cloud storage account 312 once the user 301 is physically at the printer 303. The user 301 then walks to printer (e.g., as shown by dotted line 318) and, while in the vicinity of the printer, takes an action to identify themselves to the printer 303. In one implementation, the user 301 provides the printer 303 with a user identifier 320 by selecting their print job a drop-down menu of pending print jobs on a touch screen of the printer 303. In this case, each of the queued print jobs is associated with a user identifier included in the print job 307 and the user selection of the print job 307 also serves as selection of the user identifier 320. In another implementation, the user provides other touch input (e.g., typing on printer buttons or touch screen) to supply the user identifier 320. In still other implementations, the user performs still other types of actions, such as swiping a smart card at the printer or providing other self-identifying information to the printer 303 (e.g., fingerprint, passcode, facial/retinal scan) that is usable by the printer 303 to look-up the corresponding user identifier 320.

Although the user identifier 320 is in some cases usable to identify which pending print job the user 301 is interested in, the release of this print job to the printer 303 remains contingent upon a further verification of the user 301 as being authenticated for access to the cloud storage account 312. At this point in time, the user has provided the user identifier 320 as a general form of user identification, but the credentials to the cloud storage account 312 have not yet been solicited or received. Since the printer 303 is an unsecure device, the printer is-per the disclosed methodology-prohibited from receiving the credentials to the cloud storage account 312. Instead, the printer 303 delegates the user authentication task to the delegated authenticator 314.

As a precursor to this delegation, the printer 303 provides its own device credentials 324 to the authentication provider 309 and the authentication provider 309 uses the device credentials 324 to verify the identity of the printer. In response to this verification, the authentication provider 309 transmits a device token 322 back to the printer 303. The printer 303 then transmits a delegation instruction 326 to the delegated authenticator 314. The delegation instruction 326 includes the user identifier 320 and the device token 322, and further includes a request for release (e.g., print) of the authenticated print jobs of the user 301 to the printer 303 (e.g., the jobs that have queued in association with the user identifier 320 for print at the printer 303).

FIG. 3B illustrates example operations 305 performed following transmission of the delegation instruction 326 from the printer 303 to the delegated authenticator 314 (shown in both FIG. 3A and FIG. 3B). In response to receiving the delegation instruction 326, the delegated authenticator 314 uses the user identifier included in the delegation instruction 326 to identify a communication account of the user 301. The delegated authenticator 314 then transmits an authentication request notification 330 to the communication account of the user, which the user 301 can access from a mobile secure device 328. The mobile secure device 328 may, in some implementations, be the same device as the secure device 304 of FIG. 3A (e.g., provided that the secure device 304 is mobile and can be physically transported to the printer 303), or a different device such as a smart phone, tablet, smart watch, etc.

Although the mobile secure device 328 is shown to be separate from the user 301 in FIG. 3B (e.g., to clearly illustrate the communication flows to and from the mobile secure device 328), it is assumed that the mobile secure device 328 is a device that the user 301 is in physical possession of while in the physical vicinity of the printer 303.

The user 301 logs into their communication account (e.g., an email account, messaging account) from the mobile secure device 328 and acts on the authentication request notification 330, such as by clicking on a URL included in the authentication request notification 330 to transmit a URL request 340. The URL request 340 directs to a webpage of the delegated authenticator 314. Consistent with the operations discussed with respect to FIG. 2, this webpage of the delegated authenticator 314 responds with a redirect 334 that directs the browser on the mobile secure device 328 to the webpage of the authentication provider 309. At the webpage of the authentication provider 309, the user enters the credentials 348 for the cloud storage account 312. In response to verifying the credentials for the cloud storage account 312, the authentication provider 309 generates a user token 342, which is returned to the delegated authenticator 314.

The delegated authenticator 314 then transmits a request 344 to the cloud storage provider 308. The request 344 includes the user token 342 and requests release of the pending print jobs stored in association with the user identifier 320. The storage provider 308 verifies the user token 342 and, in response to successful verification, transmits the print jobs 346 of the user to the authenticated delegator 314 which, in turn, transmits the print jobs to the printer 303 for printing.

Figure 4:
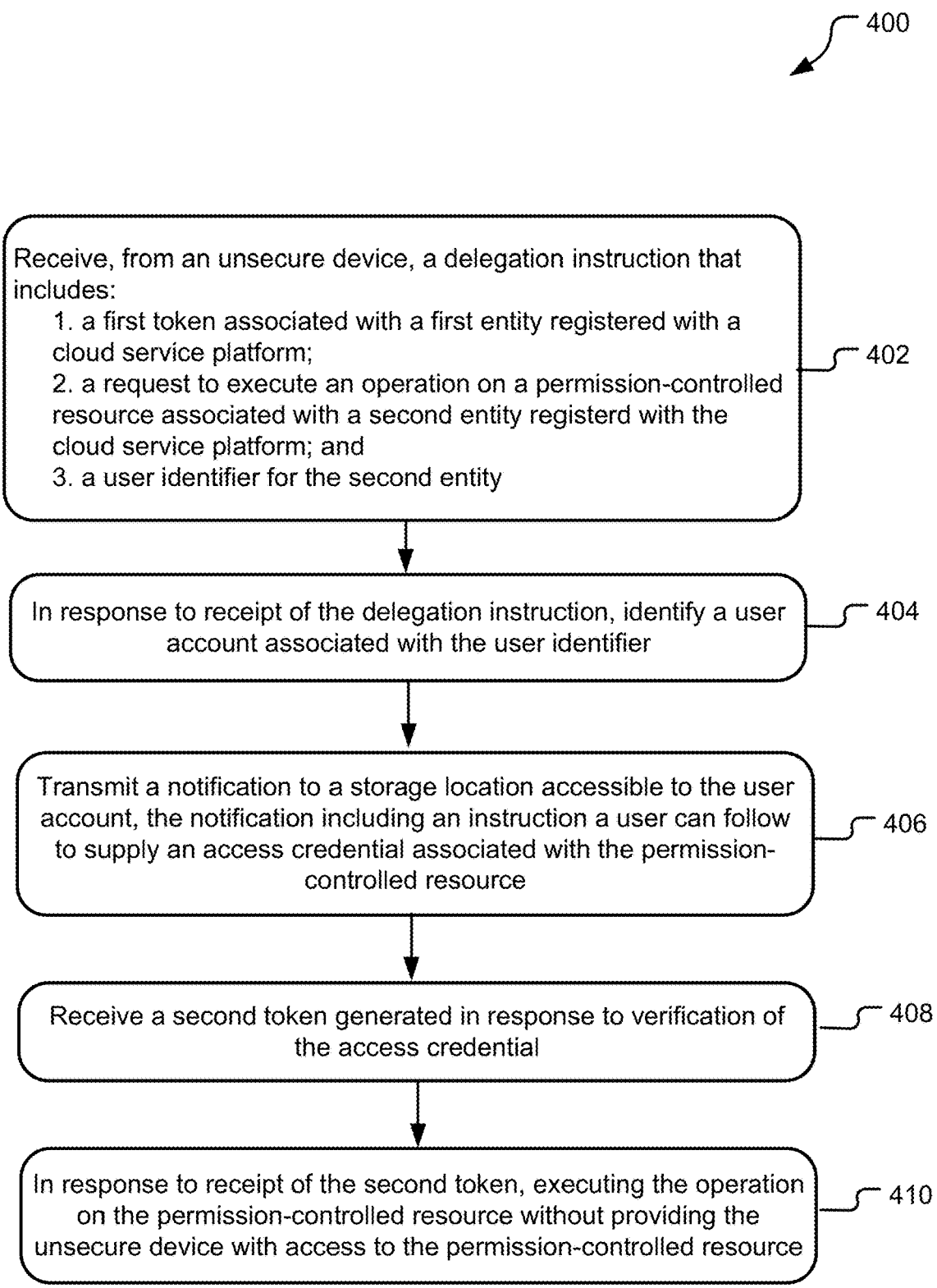
FIG. 4 illustrates example operations for securely using an unsecure device to initialize a user workflow that requires access to a permission-controlled resource.

FIG. 4 illustrates example operations 400 for securely using an unsecure device to initialize a user workflow that requires access to a permission-controlled resource. The operations include a receiving operation 402 that receives, from the unsecure device, a delegation instruction. The delegation instruction includes: (1) a first token associated with a first entity registered with a cloud service platform; (2) a request to execute an operation on a permission-controlled resource associated with a second entity registered with the cloud service platform; and (3) a user identifier for the second entity. In one implementation, the first token is a device token that the unsecure device uses to authenticate itself to the cloud service platform.

In response to receipt of the delegation instruction, an account identification operation identifies a user account associated with the user identifier. For example, the user identifier identifies a user account registered with the cloud service platform, a user communication account (either internal or external to the cloud service platform), or a user account registered with a web-based service provider hosted within the cloud service platform.

An instruction transmittal operation 406 transmits a notification to a storage location that is accessible from the user account. The notification includes a directive that a user can follow to supply an access credential associated with the permission-controlled resource. In one implementation, the notification is transmitted to an inbox of a user communication account (e.g., an email account or messaging account). In another implementation, the notification is transmitted to a cloud-based application server that hosts a user account to a web-based application. In this scenario, the web-based application is configured to present the instruction as a notification on a user interface generated during an application session associated with the user account.

In one implementation, the notification instructs the user to navigate to a particular webpage or to click a URL that triggers an access request on the permission-controlled resource. For example, the URL directs the user to a first webpage (e.g., of an authentication delegator). When the user's web browser lands at the first webpage, the domain provider of the first webpage places a request to access the permission-controlled resource and redirects the user's web browser to another webpage that is owned and managed by an authentication provider of the cloud service platform. The webpage of the authentication provider requests an access credential associated with the user identifier. When the user provides the access credential to the authentication provider, the authentication provider authenticates the access credential. If the authentication is successful, the authentication provider generates a second token that is returned to the domain provider that initiated the request.

The operations 400 further include a receiving operation 408 that receives the second token that is generated (e.g., by the authentication provider of the cloud service platform) in response to verification of the access credential in association with the user identifier.

In response to the receiving operation 408, a resource access operation 410 executes the operation on the permission-controlled resource without providing the unsecure device with access to the permission-controlled resource.

Figure 5:
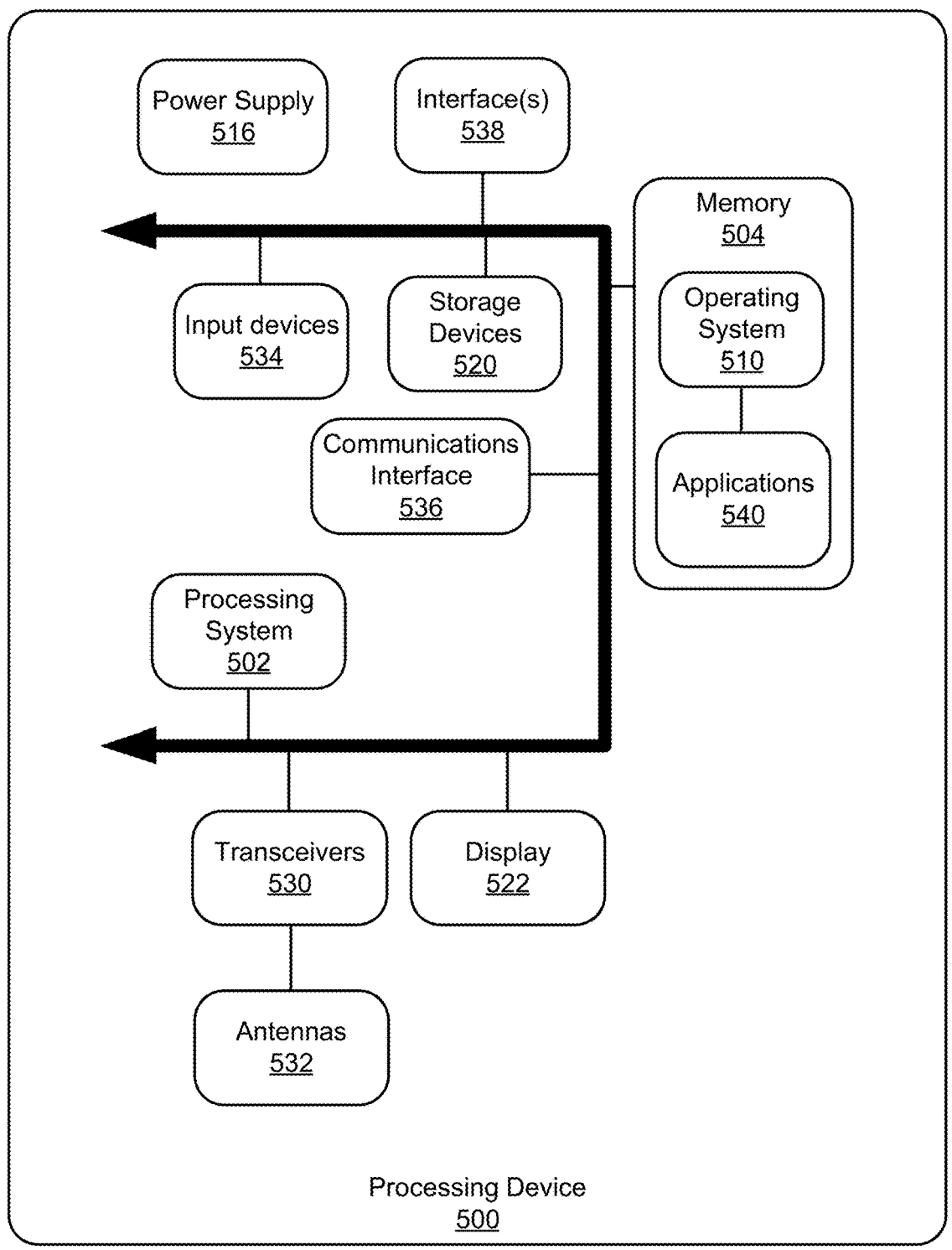
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes a processing system 502, memory device(s) 504, a display 522, and other interfaces 538 (e.g., buttons). The processor unit(s) 502 may each include one or more computer processing units (CPUs), graphics processing units (GPUs), etc.

The memory 504 generally includes both volatile memory (e.g., random access memory (RAM)) and non-volatile memory (e.g., flash memory). An operating system 510, such as the Microsoft Windows® operating system, the Microsoft Windows® Phone operating system or a specific operating system designed for a gaming device, may reside in the memory 504 and be executed by the processing system 502, although it should be understood that other operating systems may be employed.

One or more applications 540 (e.g., the delegated authenticator 214 or authentication provider 208) are loaded in the memory 504 and executed on the operating system 510 by the processing system 502. In some implementations, aspects of the delegated authenticator 214 are loaded into memory of different processing devices connected across a network. The applications 540 may receive inputs from one another as well as from various input local devices 534 such as a microphone, input accessory (e.g., keypad, mouse, stylus, touchpad, gamepad, racing wheel, joystick), or a camera.

Additionally, the applications 540 may receive input from one or more remote devices, such as remotely-located servers or smart devices, by communicating with such devices over a wired or wireless network using more communication transceivers 530 and an antenna 532 to provide network connectivity (e.g., a mobile phone network, Wi-Fi®, Bluetooth®). The processing device 500 may also include one or more storage devices 520 (e.g., non-volatile storage). Other configurations may also be employed. In one implementation, the delegated authenticator 214 is an application executing on the processing device 500 or as a distributed application with different components executing on many different devices.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared and other wireless media.

In some aspects, the techniques described herein relate to a method, performed by a delegated authenticator, that allows an unsecure device to initialize a user workflow that requires access to a permission-controlled resource, the method including: receiving, from the unsecure device, a delegation instruction including: a first token associated with a first entity registered with a cloud service platform; a request to execute an operation on the permission-controlled resource, the execution of the operation being contingent upon receipt and verification of an access credential of a second entity registered with the cloud service platform; and a user identifier for the second entity; in response to receipt of the delegation instruction, identify a user account associated with the user identifier and transmit a notification to a storage location associated with the user account, the notification including an instruction that a user can follow to provide the access credential associated with the permission-controlled resource; and in response to receiving, from a secure device, a second token generated in response to verification of the access credential, executing the operation on the permission-controlled resource without providing the unsecure device with the access credential or with access to the permission-controlled resource.

In some aspects, the techniques described herein relate to a method, wherein the permission-controlled resource is a storage account, the delegation instruction further includes a user payload, and the request to perform the operation on the permission-controlled resource includes a request to copy the user payload to the storage account.

In some aspects, the techniques described herein relate to a method, wherein the method further includes: in response to receiving the first token, copying the user payload to a secure temporary storage region provisioned for the first entity; and in response to receipt of the second token, copying the user payload from the secure temporary storage region to the storage account.

In some aspects, the techniques described herein relate to a method, wherein the notification is transmitted to a cloud-based application configured to present the notification on a user interface generated within an application session of a user associated with the user identifier, the user interface being accessible from the secure device.

In some aspects, the techniques described herein relate to a method, wherein the notification is transmitted to a communication account associated with the user identifier and wherein the notification includes a URL that links to an access-controlled webpage, wherein access to the access-controlled webpage is contingent upon verification of the access credential in association with the user identifier.

In some aspects, the techniques described herein relate to a method, wherein the first token is a device token generated by an authentication provider in response to verifying identity of the unsecure device and the second token is a user token generated by the authentication provider in response to verifying the access credential in association with the user identifier.

In some aspects, the techniques described herein relate to a method, wherein the request to execute the operation on the permission-controlled resource includes a request to release a print job from a cloud storage account to a printer.

In some aspects, the techniques described herein relate to a system for using an unsecure device to initialize a user workflow that requires access to a permission-controlled resource, the system including: a delegated authenticator stored in memory and executable to: receive a delegation instruction from the unsecure device, the delegation instruction including: a first token associated with a first entity registered with a cloud service platform; a request to execute an operation on the permission-controlled resource, the execution of the operation being contingent upon receipt and verification of an access credential of a second entity registered with the cloud service platform; and a user identifier for the second entity registered with the cloud service platform; in response receipt of the delegation instruction, identify a user account associated with the user identifier and transmit a notification to a storage location associated with the user account, the notification including an instruction that a user can follow to provide an access credential associated with the permission-controlled resource; and in response to receiving, from a secure device, a second token generated by an authenticator provider based on verification of the access credential, executing the operation on the permission-controlled resource without providing the unsecure device with access to access credential or the permission-controlled resource.

In some aspects, the techniques described herein relate to a system, wherein the permission-controlled resource is a storage account, the delegation instruction further includes a user payload, and the request to perform the operation on the permission-controlled resource includes a request to copy the user payload to the storage account.

In some aspects, the techniques described herein relate to a system, wherein the delegated authenticator is further executable to: copy the user payload to a secure temporary storage region provisioned for the first entity in response to receiving the first token; and copy the user payload from the secure temporary storage region to the storage account in response to receipt of the second token.

In some aspects, the techniques described herein relate to a system, wherein the delegated authenticator transmits the notification to a cloud-based application configured to present the notification on a user interface generated within an application session of a user associated with the user identifier, the user interface being accessible from the secure device.

In some aspects, the techniques described herein relate to a system, wherein the delegated authenticator transmits the notification to a communication account associated with the user identifier and wherein the notification includes a URL that links to an access-controlled webpage of the delegated authenticator, and wherein access to the access-controlled webpage is contingent upon verification of the access credential in association with the user identifier.

In some aspects, the techniques described herein relate to a system, wherein the first token is a device token generated by an authentication provider in response to verifying identity of the unsecure device and the second token is a user token generated by the authentication provider in response to verifying the access credential in association with the user identifier.

In some aspects, the techniques described herein relate to a system, wherein the request to execute the operation on the permission-controlled resource includes a request to release a print job from a cloud storage account to a printer.

In some aspects, the techniques described herein relate to a tangible computer-readable storage media encoding processor-executable instructions for executing a computer process, the computer process including: receiving, from an unsecure device, a delegation instruction including: a device token associated with a first entity registered for the unsecure device with a cloud service platform; a request to execute an operation on a permission-controlled resource, the execution of the operation being contingent upon receipt and verification of an access credential of a second entity registered with the cloud service platform; and a user identifier for the second entity registered with the cloud service platform; in response receipt of the delegation instruction, identify a user account associated with the user identifier and transmit a notification to a storage location associated with the user account, the notification including an instruction that a user can follow to provide an access credential associated with the permission-controlled resource; and in response to receiving, from a secure device, a user token generated in response to verification of the access credential, executing the operation on the permission-controlled resource without providing the unsecure device with the access credential or with access to the permission-controlled resource.

In some aspects, the techniques described herein relate to a tangible computer-readable storage media, wherein the permission-controlled resource is a storage account, the delegation instruction further includes a user payload, and the request to perform the operation on the permission-controlled resource includes a request to copy the user payload to the storage account.

In some aspects, the techniques described herein relate to a tangible computer-readable storage media, wherein the computer process further includes: in response to receiving the device token, copying the user payload to a secure temporary storage region provisioned for the first entity; and in response to receiving the user token, copying the user payload from the secure temporary storage region to the storage account.

In some aspects, the techniques described herein relate to a tangible computer-readable storage media, wherein the notification is transmitted to a cloud-based application configured to present the notification on a user interface generated during an application session associated with the user identifier, the user interface being accessible from the secure device.

In some aspects, the techniques described herein relate to a tangible computer-readable storage media, wherein the notification is transmitted to a communication account associated with the user identifier and wherein the notification includes a URL that links to an access-controlled webpage and wherein access to the access-controlled webpage is contingent upon verification of the access credential in association with the user identifier.

In some aspects, the techniques described herein relate to a tangible computer-readable storage media for claim 15, wherein the request to execute the operation on the permission-controlled resource includes a request to release a print job from a cloud storage account to a printer.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A method, performed by a delegated authenticator, that allows an unsecure device to initialize a user workflow that requires access to a permission-controlled resource, the method comprising:
   receiving, from the unsecure device, a delegation instruction including:
      a first token associated with a first entity registered with a cloud service platform;
      a request to execute an operation on the permission-controlled resource, the execution of the operation being contingent upon receipt and verification of an access credential of a second entity registered with the cloud service platform; and
      a user identifier for the second entity;
   in response to receipt of the delegation instruction, identify a user account associated with the user identifier and transmit a notification to a storage location associated with the user account, the notification including an instruction that a user can follow to provide the access credential associated with the permission-controlled resource; and
   in response to receiving, from a secure device, a second token generated in response to verification of the access credential, executing the operation on the permission-controlled resource without providing the unsecure device with the access credential or with access to the permission-controlled resource.

2. The method of claim 1, wherein the permission-controlled resource is a storage account, the delegation instruction further includes a user payload, and the request to perform the operation on the permission-controlled resource includes a request to copy the user payload to the storage account.

3. The method of claim 2, wherein the method further includes:
   in response to receiving the first token, copying the user payload to a secure temporary storage region provisioned for the first entity; and
   in response to receipt of the second token, copying the user payload from the secure temporary storage region to the storage account.

4. The method of claim 1, wherein the notification is transmitted to a cloud-based application configured to present the notification on a user interface generated within an application session of a user associated with the user identifier, the user interface being accessible from the secure device.

5. The method of claim 1, wherein the notification is transmitted to a communication account associated with the user identifier and wherein the notification includes a URL that links to an access-controlled webpage, wherein access to the access-controlled webpage is contingent upon verification of the access credential in association with the user identifier.

6. The method of claim 1, wherein the first token is a device token generated by an authentication provider in response to verifying identity of the unsecure device and the second token is a user token generated by the authentication provider in response to verifying the access credential in association with the user identifier.

7. The method of claim 1, wherein the request to execute the operation on the permission-controlled resource includes a request to release a print job from a cloud storage account to a printer.

8. A system for using an unsecure device to initialize a user workflow that requires access to a permission-controlled resource, the system comprising:
- a delegated authenticator stored in memory and executable to:
  - receive a delegation instruction from the unsecure device, the delegation instruction including:
    - a first token associated with a first entity registered with a cloud service platform;
    - a request to execute an operation on the permission-controlled resource, the execution of the operation being contingent upon receipt and verification of an access credential of a second entity registered with the cloud service platform; and
    - a user identifier for the second entity registered with the cloud service platform;
  - in response receipt of the delegation instruction, identify a user account associated with the user identifier and transmit a notification to a storage location associated with the user account, the notification including an instruction that a user can follow to provide an access credential associated with the permission-controlled resource; and
  - in response to receiving, from a secure device, a second token generated by an authenticator provider based on verification of the access credential, executing the operation on the permission-controlled resource without providing the unsecure device with access to access credential or the permission-controlled resource.

9. The system of claim 8, wherein the permission-controlled resource is a storage account, the delegation instruction further includes a user payload, and the request to perform the operation on the permission-controlled resource includes a request to copy the user payload to the storage account.

10. The system of claim 9, wherein the delegated authenticator is further executable to:
- copy the user payload to a secure temporary storage region provisioned for the first entity in response to receiving the first token; and
- copy the user payload from the secure temporary storage region to the storage account in response to receipt of the second token.

11. The system of claim 8, wherein the delegated authenticator transmits the notification to a cloud-based application configured to present the notification on a user interface generated within an application session of a user associated with the user identifier, the user interface being accessible from the secure device.

12. The system of claim 8, wherein the delegated authenticator transmits the notification to a communication account associated with the user identifier and wherein the notification includes a URL that links to an access-controlled webpage of the delegated authenticator, and wherein access to the access-controlled webpage is contingent upon verification of the access credential in association with the user identifier.

13. The system of claim 8, wherein the first token is a device token generated by an authentication provider in response to verifying identity of the unsecure device and the second token is a user token generated by the authentication provider in response to verifying the access credential in association with the user identifier.

14. The system of claim 8, wherein the request to execute the operation on the permission-controlled resource includes a request to release a print job from a cloud storage account to a printer.

15. A tangible computer-readable storage media encoding processor-executable instructions for executing a computer process, the computer process comprising:
- receiving, from an unsecure device, a delegation instruction including:
  - a device token associated with a first entity registered for the unsecure device with a cloud service platform;
  - a request to execute an operation on a permission-controlled resource, the execution of the operation being contingent upon receipt and verification of an access credential of a second entity registered with the cloud service platform; and
  - a user identifier for the second entity registered with the cloud service platform;
- in response receipt of the delegation instruction, identify a user account associated with the user identifier and transmit a notification to a storage location associated with the user account, the notification including an instruction that a user can follow to provide an access credential associated with the permission-controlled resource; and
- in response to receiving, from a secure device, a user token generated in response to verification of the access credential, executing the operation on the permission-controlled resource without providing the unsecure device with the access credential or with access to the permission-controlled resource.

16. The tangible computer-readable storage media of claim 15, wherein the permission-controlled resource is a storage account, the delegation instruction further includes a user payload, and the request to perform the operation on the permission-controlled resource includes a request to copy the user payload to the storage account.

17. The tangible computer-readable storage media of claim 16, wherein the computer process further includes:
- in response to receiving the device token, copying the user payload to a secure temporary storage region provisioned for the first entity; and
- in response to receiving the user token, copying the user payload from the secure temporary storage region to the storage account.

18. The tangible computer-readable storage media of claim 15, wherein the notification is transmitted to a cloud-based application configured to present the notification on a user interface generated during an application session associated with the user identifier, the user interface being accessible from the secure device.

19. The tangible computer-readable storage media of claim 15, wherein the notification is transmitted to a communication account associated with the user identifier and wherein the notification includes a URL that links to an access-controlled webpage and wherein access to the access-controlled webpage is contingent upon verification of the access credential in association with the user identifier.

20. The tangible computer-readable storage media of claim 15, wherein the request to execute the operation on the permission-controlled resource includes a request to release a print job from a cloud storage account to a printer.

* * * * *